UNITED STATES PATENT OFFICE.

PIETRO FENAROLI, OF MILAN, ITALY.

PROCESS FOR GLAZING NATURAL AND ARTIFICIAL STONES AND PLASTIC MATERIALS.

1,164,710.  Specification of Letters Patent.  Patented Dec. 21, 1915.

No Drawing.  Application filed February 21, 1913.  Serial No. 749,798.

*To all whom it may concern:*

Be it known that I, PIETRO FENAROLI, a subject of the King of Italy, residing at 38 Via San Vincenzo, Milan, in the Kingdom of Italy, have invented certain new and useful Improvements in Processes for Glazing Natural and Artificial Stones and Plastic Materials, of which the following is a specification.

This invention relates to a process for glazing stones and like bodies and more particularly to a process in which the bodies are varnished with a mixture containing alkaline silicates and then exposed to the action of the air.

The object of the invention is to obtain an insoluble and durable glaze and to this end the mixture containing the alkaline silicates is subjected to a hydrolyzing treatment whereby the alkaline elements are removed from the glaze.

If a surface, constituted for instance of cement, papier mâché or other material and which is able to withstand the effects of water and heat up to 150° C., is covered in the known manner with a thin layer of a mixture of silicated sodium or potassium and pulverized marble or other white or colored powder, for instance barium carbonate, zinc oxid, magnesium oxid, iron oxid and the like, said powder being capable of slowly reacting with silicated salt and to form in consequence insoluble bodies, and if this layer is left to dry in the air at the temperature of a room, then the silica of the silicated salt will coagulate owing to the carbonic acid contained in the air and will be after a few days more or less insoluble in water. It is further known that after coating and drying the surface in a drying oven at a temperature of about 150° C., the surface quickly attains a remarkable hardness the consequence of energetic coagulation. This process can be repeated until a sufficiently thick, uniform and opaque layer of glazing is obtained.

In order to render the surface of the glaze more lustrous and more impervious it can be provided with one or more coatings of pure silicated sodium and after drying it is heated in the ordinary manner. To avoid cracks and to increase the elasticity of the silicated salt, it is preferable to add to the latter some casein dissolved in ammoniac.

The present invention relates to a process by means of which the soluble salts contained or formed on objects glazed in the above manner, will be extracted completely and thus the object is rendered washable and will not be affected by atmosphere charges. This aim is attained by subjecting the object, glazed in the above manner, to a leaching treatment which forms directly a colloidal film of silica from the silicated salt; said film coagulating owing to the effects of heat and the atmospheric carbonic acid. To this end it would suffice, theoretically, to immerse the object in water and to insure that, by means of thorough circulation and renovation of the water, the sodium or potassium, which will be freed by hydrolysis and quickly by the washing, should be extracted. But if during such treatments the glaze breaks up or softens in the lower layers owing to the large amount of alkalis which are freed by hydrolysis partial dissolution of the silica occurs if a certain degree of concentration is passed. To eliminate this drawback, it is advisable, after the first water treatment, to treat the object repeatedly with slightly acidulated baths, such acids being used which do not form with the bodies contained in the glaze, any other soluble bodies. A preferable course would be to use baths which contain salts easily hydrolyzed. The following are a few of the acids which can be used in practice: sulfuric acid, fluor hydric acid, fluor-silicic acid, etc., and the salts would be aluminium salts which correspond to the above acids and which have the advantage that they form on the glazed object a precipitate of clay which increases the impermeability and luster of the glazed surface. If the bath is not too acid, it is advantageous to raise the temperature to 100° which accelerates the leaching process.

During the leaching operation the alkaline silicates in the glaze are hydrolyzed with the result that not only are the soluble silicates dissolved, but the dissolved molecules are further split up into their ions, as will appear from the following reactions which are given by way of example:

(1) 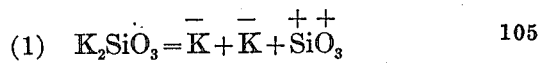

(2) 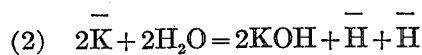

(3) 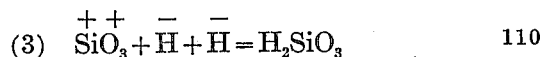

(4) 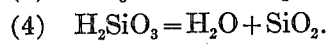

Reaction (1) will only take place in the presence of a large volume of water. If the concentration of potassium ions becomes appreciable, caustic potash will form as in reaction (2). As this would then dissolve silica ($SiO_2$) from the glaze its formation must be prevented and this is effected by the acid of the slightly acidified solutions. The alkaline element is thus removed from the glaze and thereupon neutralized.

Reaction (3) represents the formation of silicic acid which decomposes into $SiO_2$ and water so that according to the invention no silica is lost from the glaze during its treatment.

The following is a practical guide for glazing successfully a cement plate by the new process: The glaze consisting of 1 part by weight of pulverized marble and 1 part by weight of silicated sodium at 30 Bé. is sprayed upon the object. The coating is done in thin layers, each of which is heated up to 150° till the desired strength and result are attained. After this the surface is varnished with silicated sodium at 23 Bé. to which 1 part by weight of casein dissolved in ammoniac has been added (if owing to the addition of the latter the mixture became turbid it could be filtered) and after each or every two coatings it is heated up to 150°. The plate is subsequently immersed for 24 hours in each of the following baths which are kept circulating by pumps or injectors: I. Ordinary water. II. Water to which is added 3% of fluor silicic acid or $H_2SiF_6$. III. Water to which is added 6% of fluor silicic acid or $H_2SiF_6$. IV. Mixture of 5% aluminium sulfate and 0.1% of sulfuric acid at 66° Bé. The effect of the latter bath can be greatly increased by leaving the object more than 24 hours in it, according to the thickness of the layer of glazing and can be heated up to 80°. After this treatment the glaze obtained on the object is very hard, entirely free of alkalis, unaffected by either warm or cold water and is also permanently proof against atmospheric changes and all this owing to the fact that it is neither soluble in water nor contains any soluble salts.

What I claim and desire to secure by Letters Patent of the United States is:—

1. A process for glazing stones and like bodies which consists in varnishing said bodies with a mixture containing alkaline silicates, heating said bodies in a dry atmosphere and decomposing the soluble alkali silicates contained in the glaze by hydrolyzing the said soluble silicates in a relatively large quantity of water then in very dilute acids and finally in an acid solution of a salt capable of being readily hydrolyzed and of imparting an acid action to the solution.

2. A process for glazing stones and like bodies which consists in varnishing said bodies with a mixture containing alkaline silicates, heating said bodies in a dry atmosphere and removing the alkaline elements from the glaze by a leaching treatment for many hours with water, then dilute hydrofluosilicic acid and finally a solution of an aluminium salt substantially as described.

3. A process for glazing stones and like bodies which consists in varnishing said bodies with a mixture containing soluble silicates, heating said bodies in a dry atmosphere and decomposing the soluble alkaline silicates by leaching treatment with a solution of an aluminium salt substantially as described.

In testimony whereof I affix my signature in presence of two witnesses.

PIETRO FENAROLI.

Witnesses:
P. J. KEELAN,
B. CARLO SALVOTTI.